(12) United States Patent
Kerestes et al.

(10) Patent No.: US 10,335,958 B2
(45) Date of Patent: *Jul. 2, 2019

(54) ROBOTIC END EFFECTOR QUICK CHANGE MECHANISM WITH SWITCHABLE MAGNETIC COUPLER

(71) Applicant: The Boeing Company, Chicago, IL (US)

(72) Inventors: Jason A. Kerestes, Summerville, SC (US); Dennis R. Mathis, Charleston, SC (US)

(73) Assignee: The Boeing Company, Chicago, IL (US)

( * ) Notice: Subject to any disclaimer, the term of this patent is extended or adjusted under 35 U.S.C. 154(b) by 506 days.

This patent is subject to a terminal disclaimer.

(21) Appl. No.: 15/017,814

(22) Filed: Feb. 8, 2016

(65) Prior Publication Data

US 2017/0225339 A1  Aug. 10, 2017

(51) Int. Cl.
*B25J 15/00* (2006.01)
*B25J 15/04* (2006.01)

(52) U.S. Cl.
CPC .......... *B25J 15/0441* (2013.01); *Y10S 901/41* (2013.01); *Y10S 901/44* (2013.01)

(58) Field of Classification Search
CPC .... B25J 15/0441; Y10S 901/41; Y10S 901/44
See application file for complete search history.

(56) References Cited

U.S. PATENT DOCUMENTS

| | | | |
|---|---|---|---|
| 4,635,328 A | 1/1987 | Palmer | |
| 4,856,177 A * | 8/1989 | Takeuchi | B23B 31/006 235/449 |
| 5,954,446 A * | 9/1999 | Ireland | B23K 9/32 403/11 |
| 6,142,722 A * | 11/2000 | Genov | G03F 7/70741 414/217 |
| 8,936,290 B1 | 1/2015 | Salisbury | |
| 9,089,977 B2 * | 7/2015 | Claffee | B25J 9/0015 |
| 9,114,540 B2 * | 8/2015 | Claffee | B25J 9/0015 |
| 9,327,412 B2 * | 5/2016 | Claffee | B25J 15/08 |
| 9,669,551 B1 * | 6/2017 | Salisbury | B25J 15/0009 |
| 9,974,235 B2 * | 5/2018 | Van De Vegte | A01G 18/70 |
| 2016/0311068 A1 * | 10/2016 | Jesser | F23D 14/52 |

(Continued)

FOREIGN PATENT DOCUMENTS

DE       200 18 124 U1    3/2002
DE  10 2013 111938 B3   11/2014

(Continued)

*Primary Examiner* — Victor L MacArthur
(74) *Attorney, Agent, or Firm* — Felix L. Fischer

(57) ABSTRACT

A robotic end effector quick change coupling apparatus employs a drive motor assembly having a center drive interface. A coupling component having a magnetic element extends from the drive motor assembly concentric with the center drive interface. An end effector tool has a drive connection adapted to removably receive the center drive interface. A mating coupling component having a mating magnetic element extends from the end effector tool concentric with the drive connection. The magnetic element and mating magnetic element are separably engaged by mutual magnetic attraction to couple the end effector to the drive motor assembly.

20 Claims, 20 Drawing Sheets

(56) References Cited

U.S. PATENT DOCUMENTS

| | | |
|---|---|---|
| 2017/0120454 A1 | 5/2017 | Ferguson |
| 2017/0225339 A1* | 8/2017 | Kerestes .............. B25J 15/0441 |
| 2017/0225341 A1* | 8/2017 | Kerestes .............. B25J 17/0208 |
| 2017/0265392 A1* | 9/2017 | Van De Vegte ..... B25J 15/0057 |

FOREIGN PATENT DOCUMENTS

| | | |
|---|---|---|
| SU | 1 556 896 A1 | 4/1990 |
| WO | 2016029299 A1 | 3/2016 |

* cited by examiner

ROBOTIC END EFFECTOR QUICK CHANGE MECHANISM WITH SWITCHABLE MAGNETIC COUPLER

BACKGROUND INFORMATION

Field

Embodiments of the disclosure relate generally to the coupling of robotic end effectors and more particularly to a system employing concentric magnetic engagement of an end effector tool on a drive motor assembly with a center drive interface.

Background

Robotic manipulators are employed in many phases of modern manufacturing. Different end effectors are typically attached to arms on the manipulator to accomplish different tasks using the same generalized robot system. Existing solutions for quick change tool heads or end effectors require additional actuators to mechanically lock end effector in place. Typical locking system operate using pneumatics or electrical devices. These create additional volume and mass at the end of the manipulator arm and/or the end effector and require additional controls to engage or disengage the end effector from the manipulator arm.

It is therefore desirable to provide a method and system to allow attachment and replacement of end effectors on robotic manipulators with reduced complexity, minimal force and without the need for additional actuators. It is also desirable to reduce cost through automation.

SUMMARY

Embodiments disclosed herein provide a robotic end effector quick change coupling apparatus employing a robotic manipulator having a coupling component having a magnetic element. An end effector tool has a mating coupling component having a mating magnetic element. The magnetic element and mating magnetic element are separably engaged by mutual magnetic attraction to couple the end effector to the drive motor assembly, whereby the robotic manipulator engages or disengages the end effector.

The embodiments allow a method for coupling a robotic end effector wherein a robotic manipulator is aligned with an end effector. A magnetic element incorporated in a coupling component extending from the drive motor assembly concentric with the center drive interface and a mating magnetic element incorporated in a mating coupling component extending from the end effector tool are then separably engaged by magnetic attraction.

The features, functions, and advantages that have been discussed can be achieved independently in various embodiments of the present disclosure or may be combined in yet other embodiments, further details of which can be seen with reference to the following description and drawings.

DETAILED DESCRIPTION

Embodiments disclosed herein provide a system that incorporates magnetic coupling of an end effector to a drive motor assembly attached to a robot manipulator. By magnetically attaching the end effector, easy engagement and disengagement from the drive motor assembly may be accomplished. Mating antirotational features in the end effector and drive motor assembly prevent rotation of the end effector during operation of the motor.

Figure 1A:
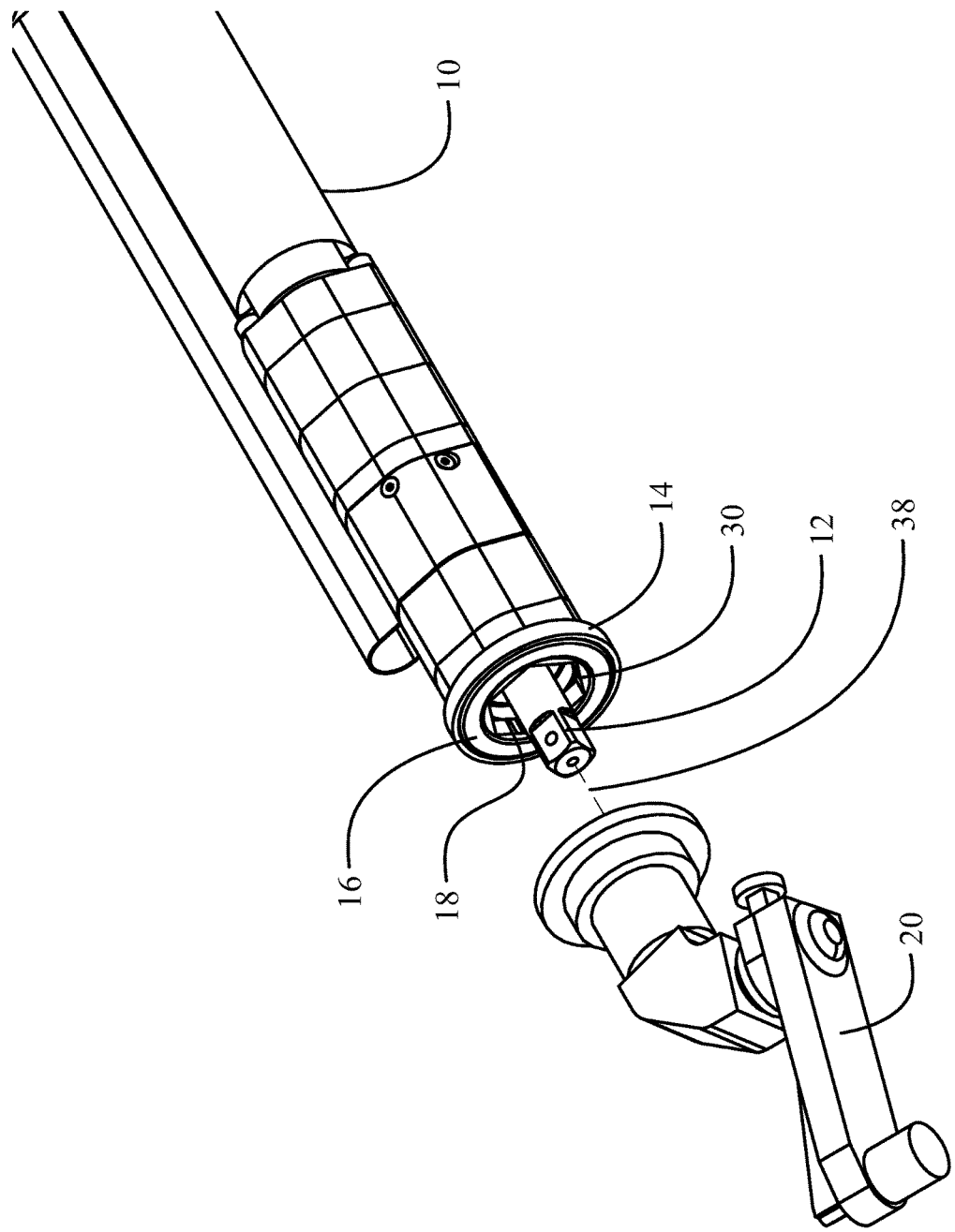
FIG. 1A is pictorial depiction of a first embodiment employing a drive motor assembly and end effector showing the details of the coupling components on the drive motor assembly.
Figure 1B:
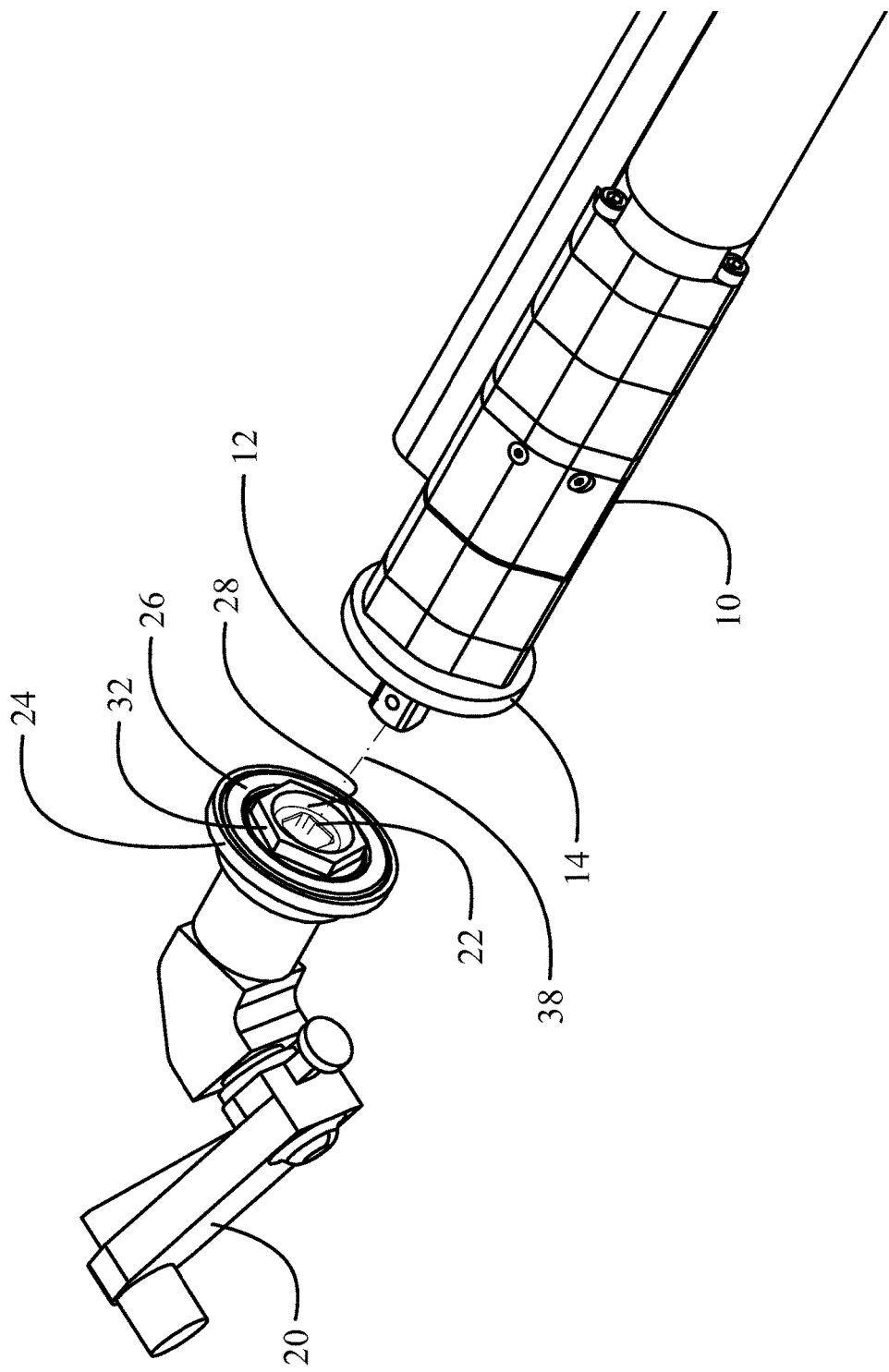
FIG. 1B is pictorial depiction of the first embodiment showing the details of the mating coupling components on the end effector.
Figure 1C:
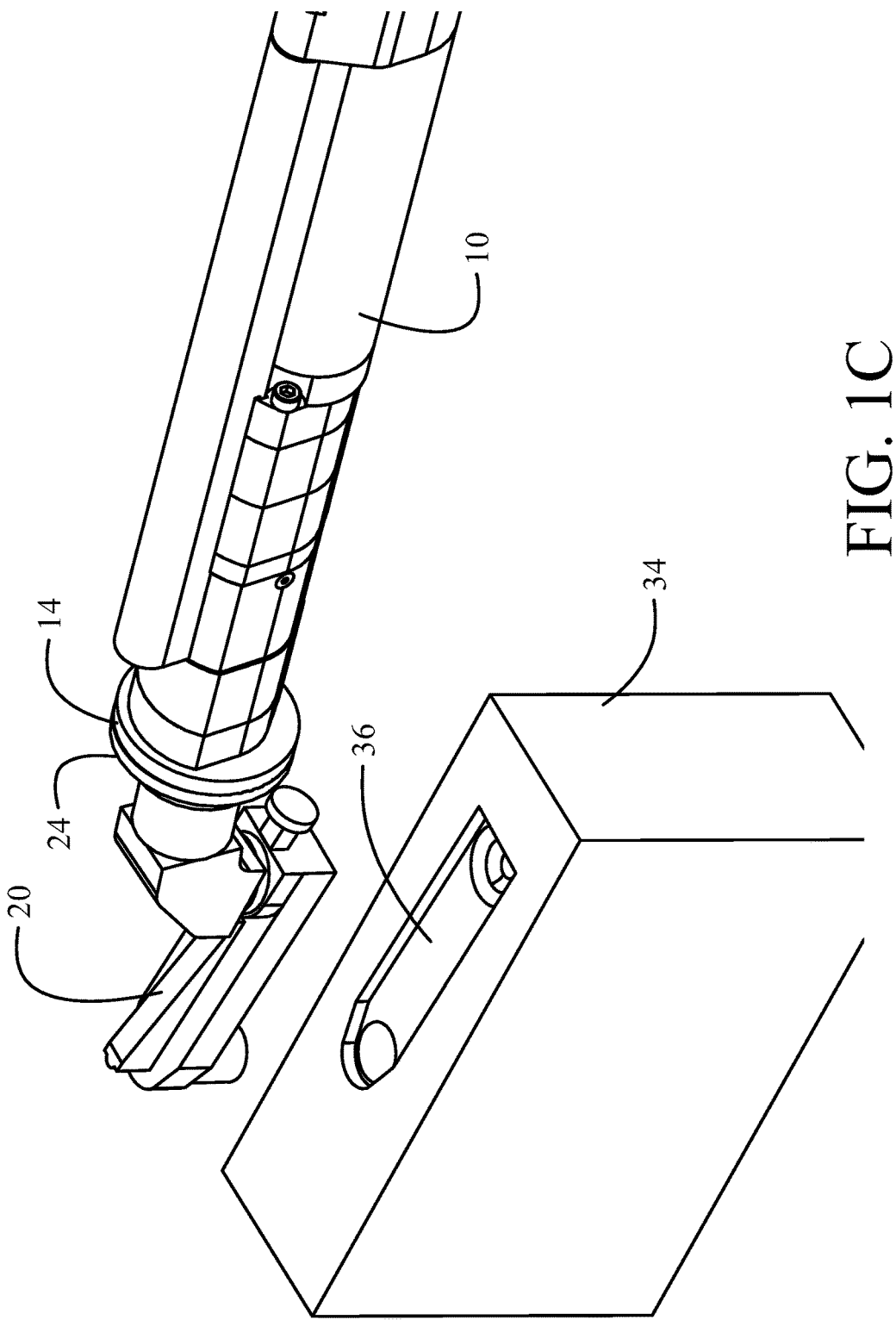
FIG. 1C is a pictorial depiction of the assembled drive motor assembly and end effector positioned over a tool head receiver block.

Referring to the drawings, FIGS. 1A-1C show a first embodiment of the robotic end effector quick change coupling apparatus. A drive motor assembly 10, which may be attached to a robot manipulator, has a center drive interface 12. As seen in FIG. 1A, a coupling component, a first flange 14 for the first embodiment, extends from the drive motor assembly 10 concentric with the center drive interface 12. The first flange 14 of the coupling component supports a magnetic element 16 which may take various forms as will be described subsequently. An aperture 18 in the first flange 14 allows engagement of the center drive interface 12. As seen in FIG. 1B, an end effector 20 has a drive connection 22 adapted to removably receive the center drive interface 12. The end effector 20 may include such elements as a hole maker, a hole filler, inspector/scanner end effectors and painter end effectors. A mating coupling component, a second flange 24 for the first embodiment, extends from the end effector tool 20 concentric with the drive connection 22. The second flange 24 supports a mating magnetic element 26. The magnetic element 16 and mating magnetic element 26 separably engage by mutual magnetic attraction to connect the end effector tool 20 to the drive motor assembly 10. A mating aperture 28 in the second flange 24 allows engagement of the center drive interface 12 and drive connection 22 contact of the flange 14 and mating second flange 24 mutually engages the center drive interface 12 and drive connection 22.

Returning to FIG. 1A, an antirotation mechanism has a first portion associated with the coupling component and a second portion associated with the mating coupling component. For the exemplary embodiment, the first portion employs hex surfaces 30 surrounding the aperture 18 as a relief in the first flange 14 while the second portion employs a hexagonal shoulder 32 (seen in FIG. 1B), the relief and shoulder constituting mating hex features. When the flange 14 and second flange 24 are engaged by the magnetic element 16 and mating magnetic element 26 the hex features interlock preventing relative rotation between the end effector 20 and the drive motor assembly 10.

Figure 1D:
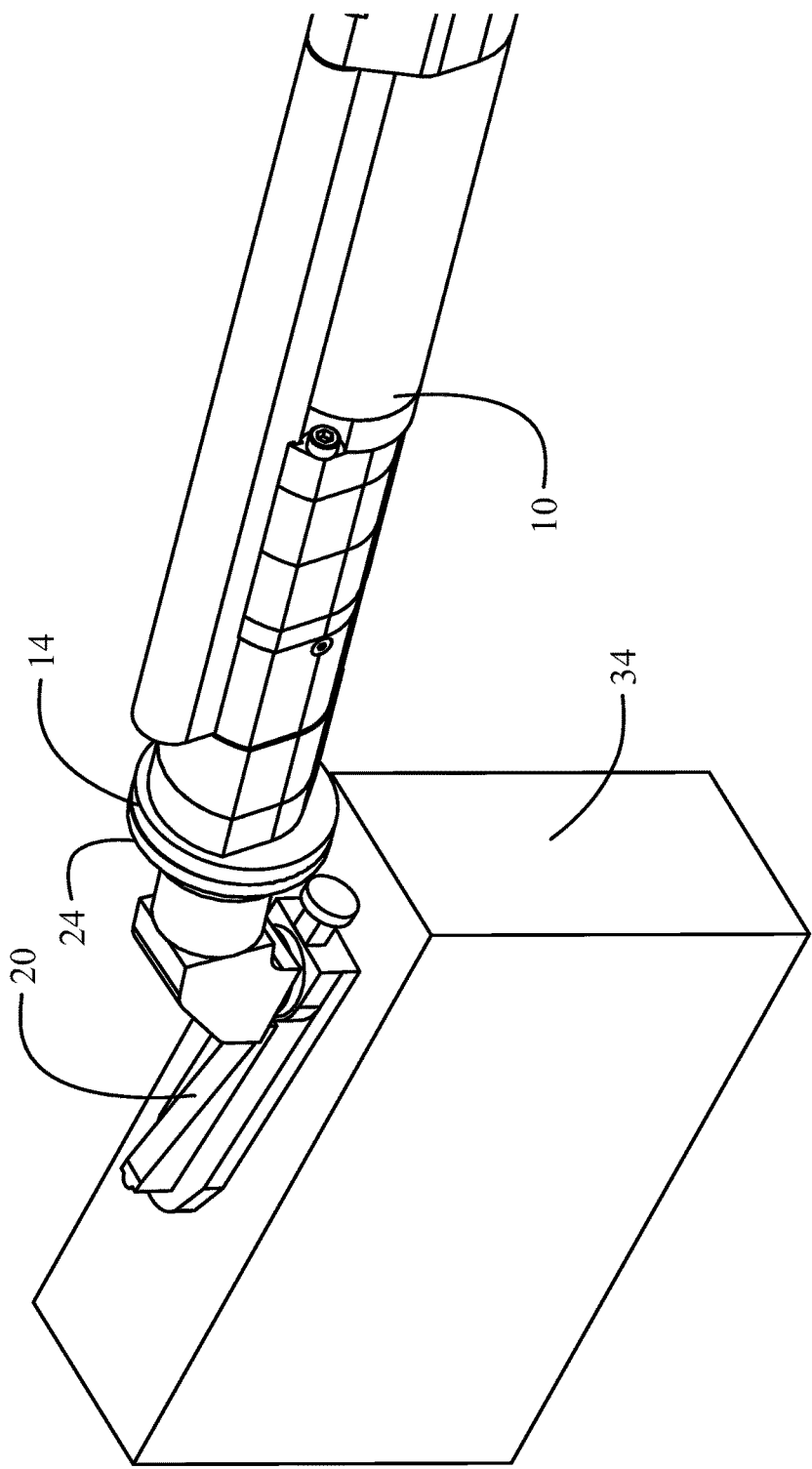
FIG. 1D is a pictorial depiction of the tool head of the end effector received in the tool head receiver block.
Figure 1E:
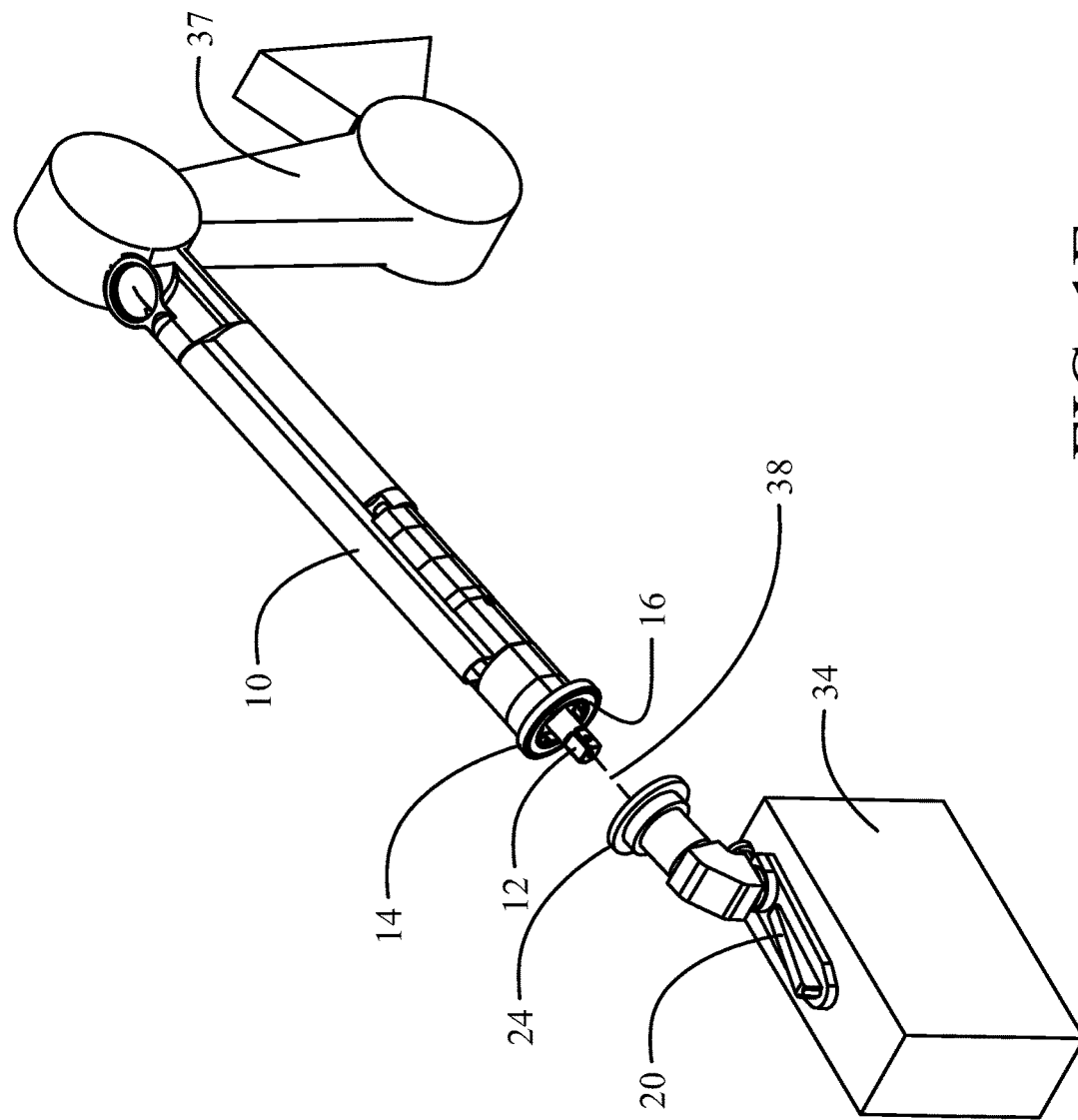
FIG. 1E is a pictorial depiction of the end effector engaged in the tool head receiver block released from the drive motor assembly.

As seen in FIG. 1C, with the end effector 20 engaged to the drive motor assembly 10, the robotic manipulator 37 (shown in FIG. 1E) may position and operate the end effector 20 for manufacturing operations. A tool holder 34 may be employed to hold the end effector 20 for pickup by or disengagement from the drive motor assembly 10. For the embodiment shown, the tool holder 34 incorporates a relief 36 sized to closely receive the profile of the end effector 20 as seen in FIG. 1D. The drive motor assembly 10 may then be withdrawn by robotic manipulator 37 along a connection axis 38 through the center drive interface 12 to break the magnetic engagement between the magnetic element 16 and mating magnetic element 26 thereby freeing the end effector 20 from the drive motor assembly as seen in FIG. 1E.

Figure 1F:
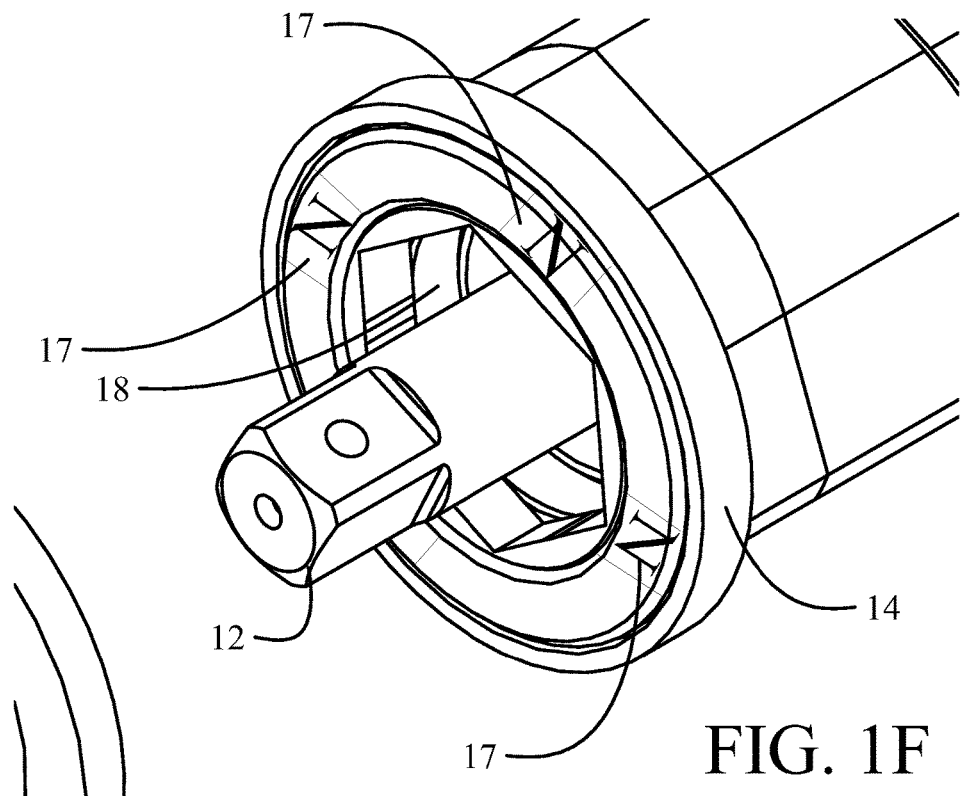
FIG. 1F is a detailed pictorial depiction of the connection components of the drive motor assembly.
Figure 1G:
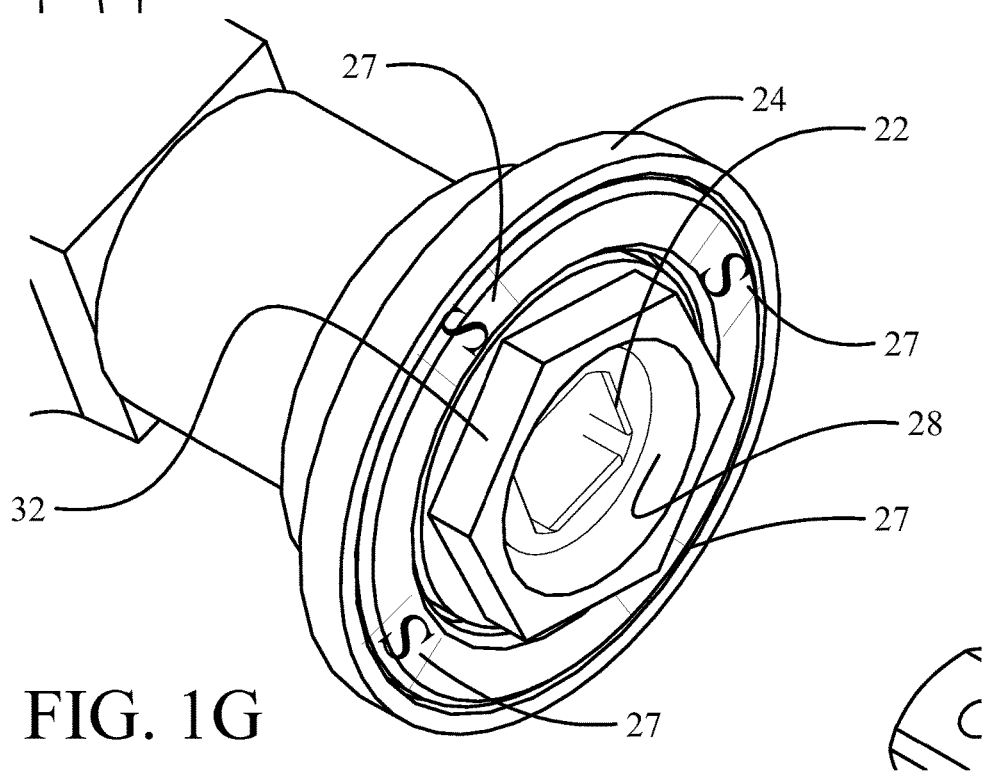
FIG. 1G is a detailed pictorial depiction of the connection components of the end effector.

As previously discussed, the magnetic element 16 and mating magnetic element 26 may take several forms. In the first embodiment, the magnetic element 16 may be a ring magnet in the flange 14 as shown in FIG. 1A. The mating magnetic element 26 may then be a magnetically attractive metal ring or a second ring magnet of opposite polarity in the second flange 24 as seen in FIG. 1B. As an alternative, the magnetic element 16 may be a plurality of magnets 17 concentrically spaced on the flange as seen in FIG. 1F. To enhance the magnetic field produced the magnets 17 may have the magnetic poles aligned with common polarity as indicated by the "N" designation on the magnets 17. With a plurality of magnets in the first flange 14, the mating magnetic element 26 may again be a ring of magnetically attractive metal as shown in FIG. 1 B or, as seen in FIG. 1G, may be a mating plurality of either ferromagnetic coupons or magnets, oriented with opposite polarity to the magnets 17 as indicated by the "S" designation, as mating magnetic elements 27, in embodiments where it is advantageous that flange 24 is made from a non-magnetic material such as aluminum.

Figure 2A:
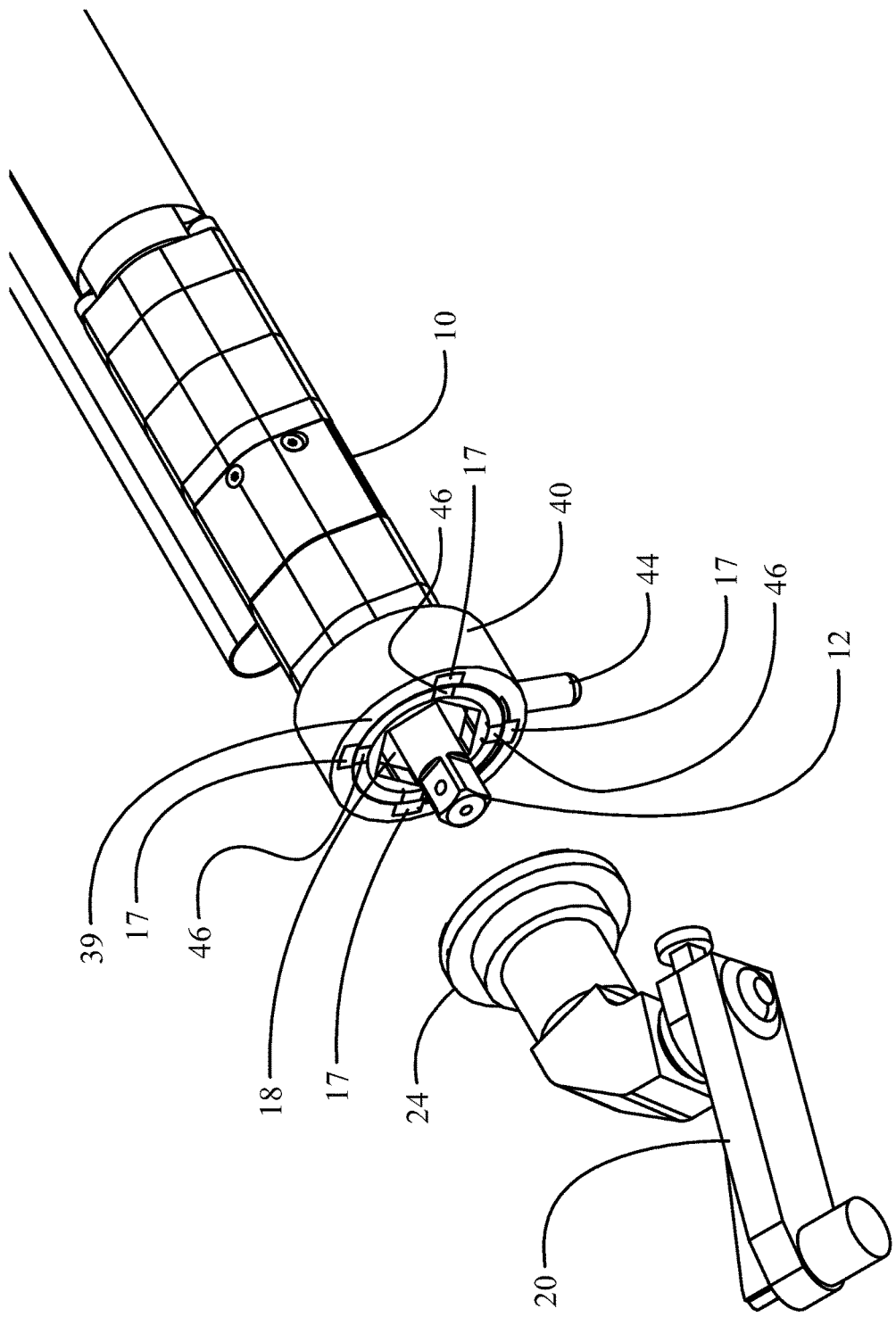
FIG. 2A is a pictorial depiction of a second embodiment employing a drive motor assembly and end effector showing the details of the coupling components with a rotatable sleeve on the drive motor assembly.
Figure 2B:
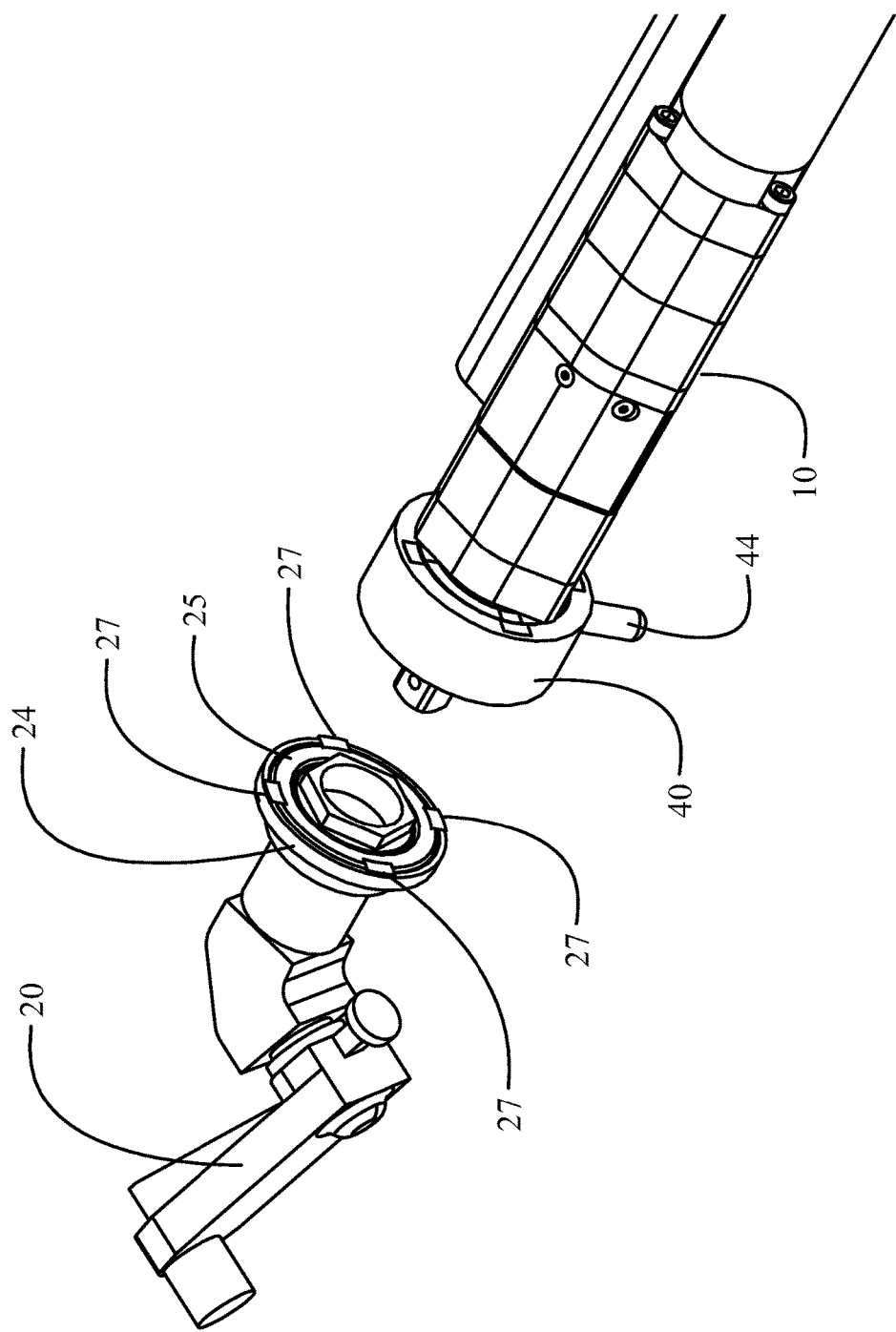
FIG. 2B is pictorial depiction of the second embodiment showing the details of the mating coupling components on the end effector.
Figure 2C:
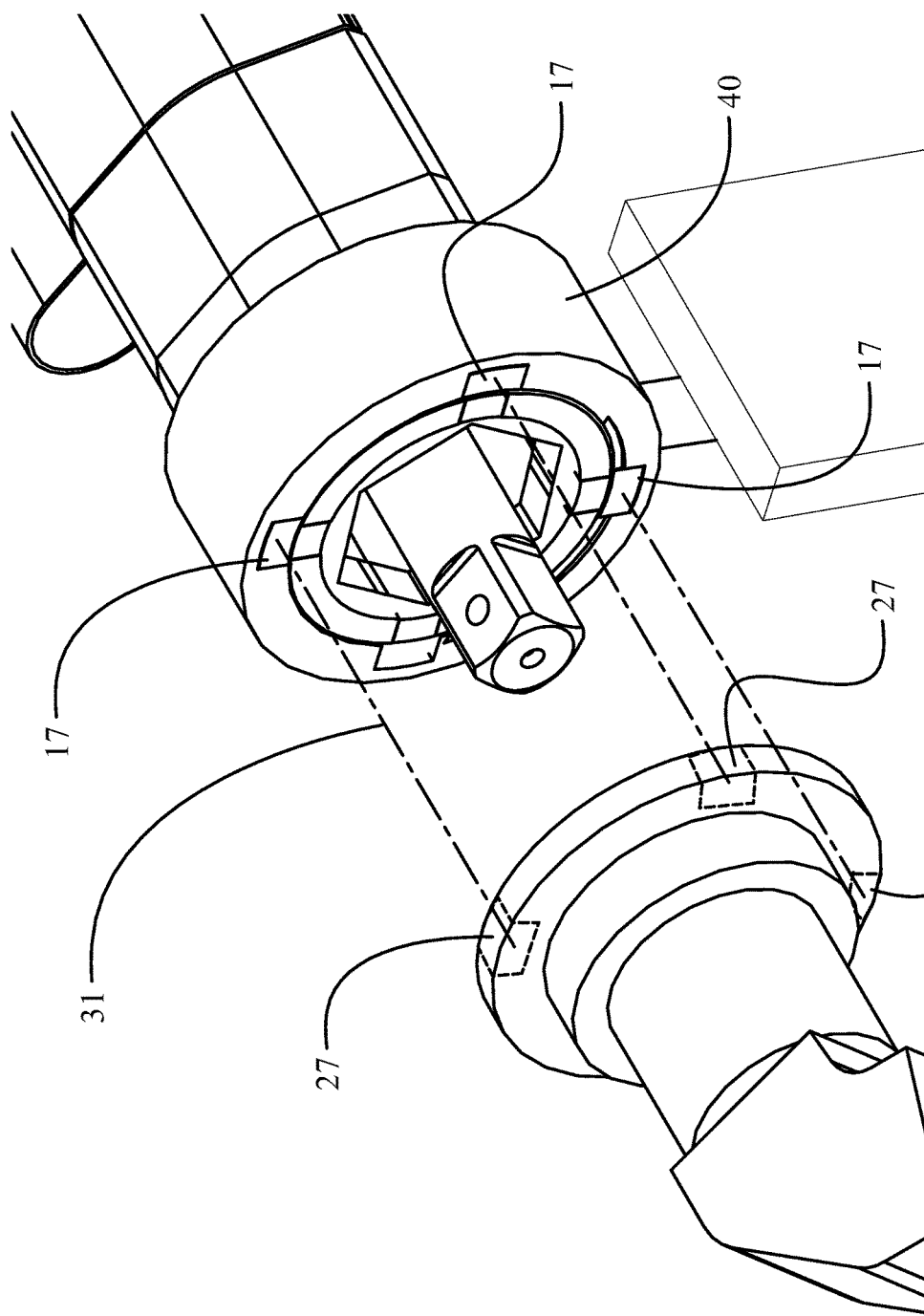
FIG. 2C is a pictorial depiction of the drive motor assembly with the sleeve rotated in a first engagement position and end effector held in the tool head receiver block.

An enhanced second embodiment is shown in FIGS. 2A and 2B. As seen in FIG. 2A, the magnets 17 may be held in a pattern on a face 39 of a rotatable sleeve 40 which concentrically surrounds the center drive interface 12. As seen in FIG. 2B, the mating magnetic elements 27 are positioned in a mating pattern in a non-magnetic mating face 25 on the second flange 24 on the end effector 20 such that with the rotatable sleeve 40 at a first rotational position the magnets 17 and mating magnetic elements 27 are aligned (as shown by phantom lines 31) for maximum magnetic attraction as seen in FIG. 2C and when the drive motor assembly 10 and end effector 20 are engaged along the connection axis 38 by the robotic manipulator, the magnets 17 and mating magnetic elements 27 are magnetically engaged. The magnetic elements 27 may be magnets or ferromagnetic coupons as previously described. If the magnetic elements 27 are optionally magnets, then the face 39 would be fabricated from non-magnetic material. As in the first embodiment, contact of the face 39 and mating face 25 on flange 24 mutually engages the center drive interface 12 and drive connection 22. By rotating the rotatable sleeve 40 to a second position with the magnets 17 and mating magnetic elements 27 no longer aligned (as indicated by the phantom lines 31) as seen in FIG. 2D, the magnetic attraction is minimal and little or no force is required for the robotic manipulator 37 to separate the end effector and drive motor assembly.

Figure 2D:
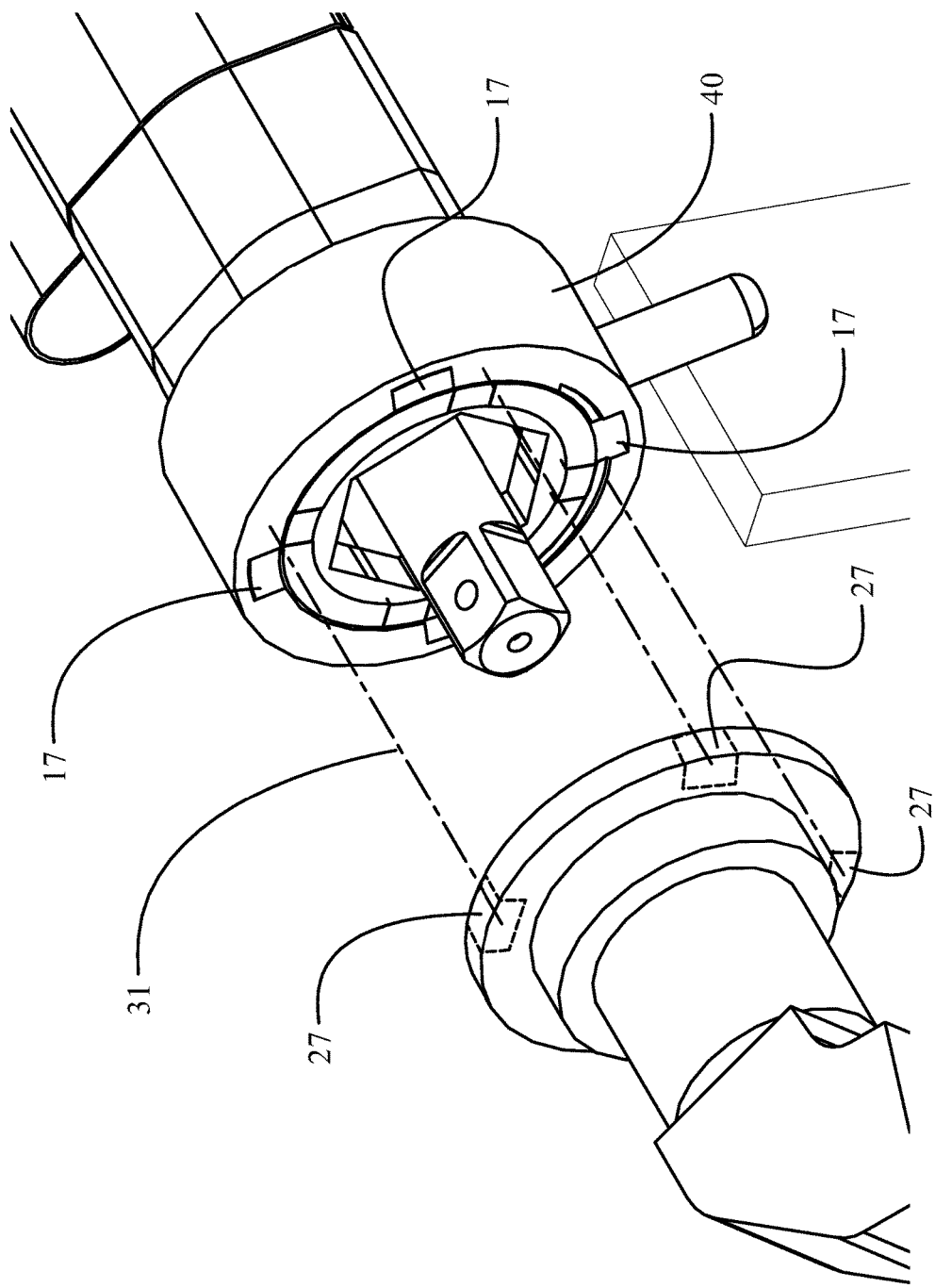
FIG. 2D is a pictorial depiction of the drive motor assembly with the sleeve rotated in a second disengagement position and end effector held in the tool head receiver block.
Figure 2E:
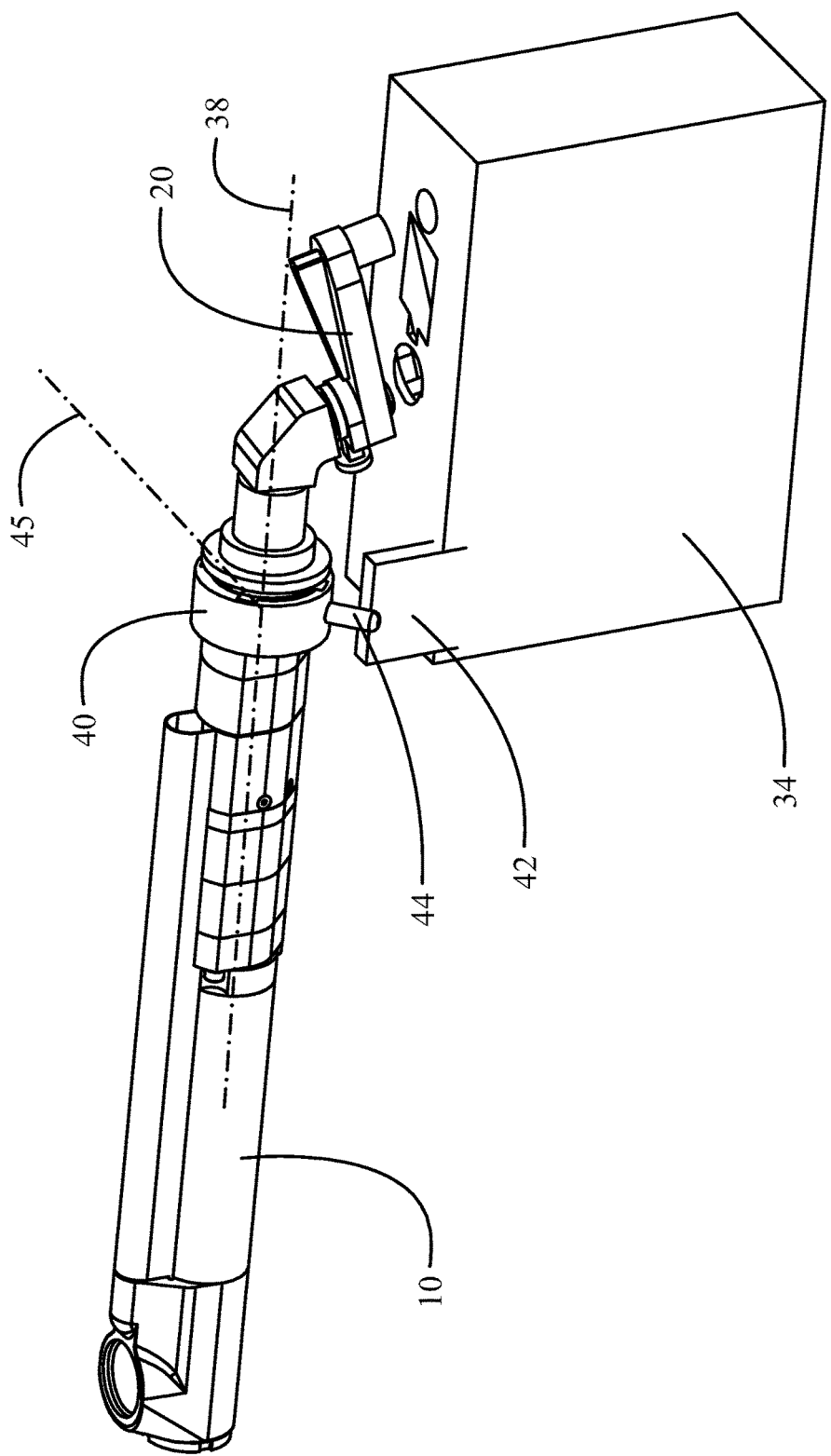
FIG. 2E is a pictorial depiction of the second embodiment of the end effector engaged to the drive motor assembly and extracted from the tool head receiver block.

As seen in FIG. 2E, a paddle 42 may extend from the tool holder 34 and lateral motion of the drive motor assembly 10 along a lateral axis 45 perpendicular to the connection axis 38 by the robotic manipulator engages a lever 44 extending from the rotatable sleeve 40 to rotate the sleeve 40. Engagement of the paddle 42 by the lever 44 in a first direction along the lateral axis 45 induces rotation of the rotatable sleeve 40 for alignment of the magnets 17 and mating magnets 27 for activating magnetic engagement. While engagement of the paddle 42 in a second direction along the lateral axis 45 induces rotation of the rotatable sleeve 40 to misalign the pattern of magnets 17 and magnetic elements 27 to deactivate the magnetic engagement.

Figure 2F:
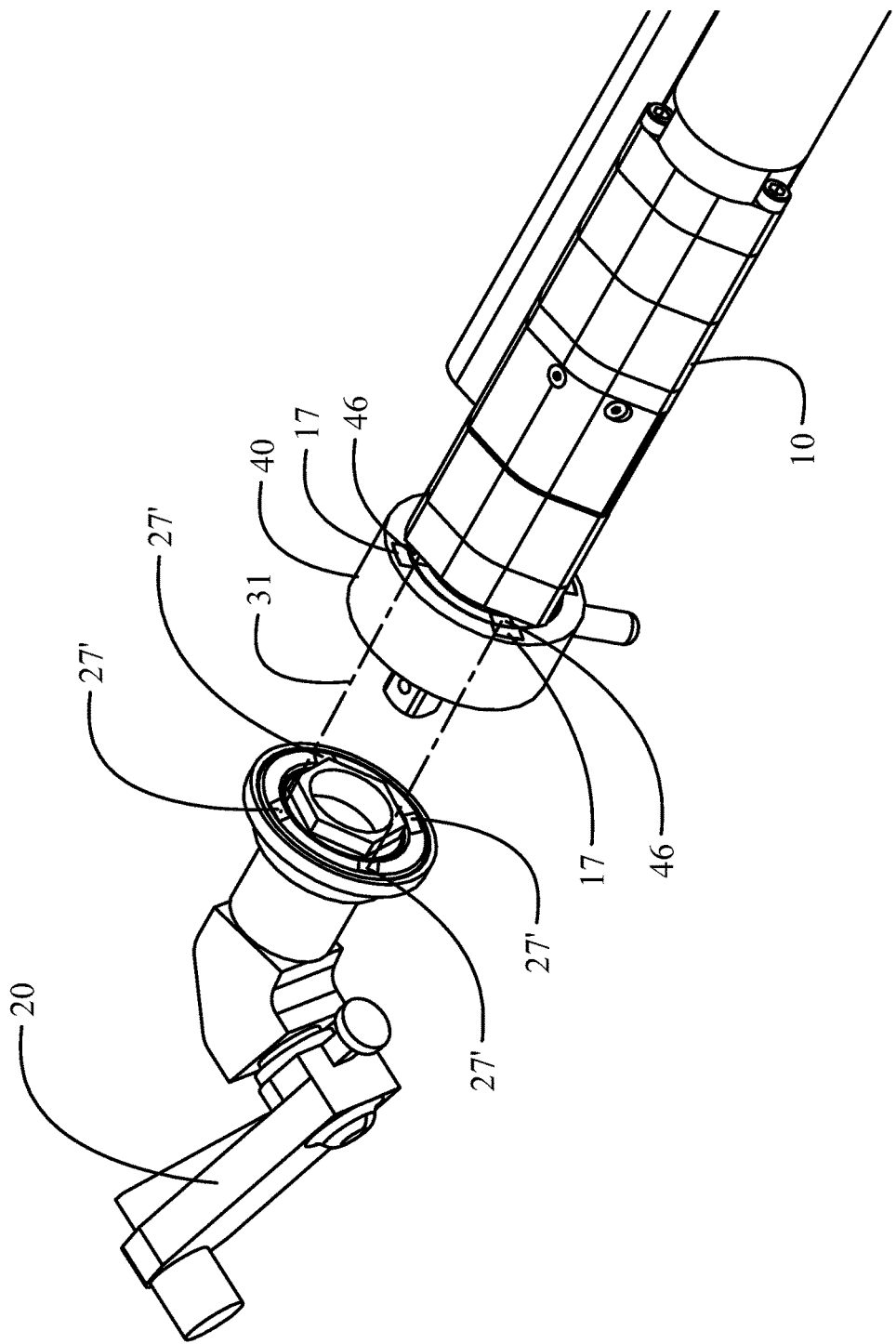
FIG. 2F is pictorial depiction of a modification of the second embodiment employing magnets in the rotatable sleeve on the drive motor assembly for alignment with metallic inserts which magnetically engage iron or other ferromagnetic coupons in the end effector flange.

The second embodiment may alternatively employ magnetically attractive metal inserts 46 as seen in FIGS. 2A, 2C and 2D which are fixed in the flange 14 and align with the magnets 17 in the first rotational position of the rotatable sleeve 40. When aligned, the metal inserts 46 will have an induced magnetic field from the magnets 17. When not aligned with the rotatable sleeve 40 in the second rotational position, the metal inserts 46 will not have any magnetic field. By positioning the mating magnetic elements 27' in the flange 24 on the end effector 20 for alignment with the metal inserts 46 as seen in FIG. 2F, magnetic attraction between the metal inserts and the mating magnetic elements 27' will be present when the magnets 17 are aligned with the metal inserts 46 in the first rotational position of the rotatable sleeve 40 to provide magnetic engagement between the drive motor assembly and end effector 20. However, when the rotatable sleeve 40 is rotated to the second rotational position no magnetic field will be present in the metal inserts 46 and therefore no magnetic attraction with the mating magnetic elements 27' will be present.

Figure 3A:
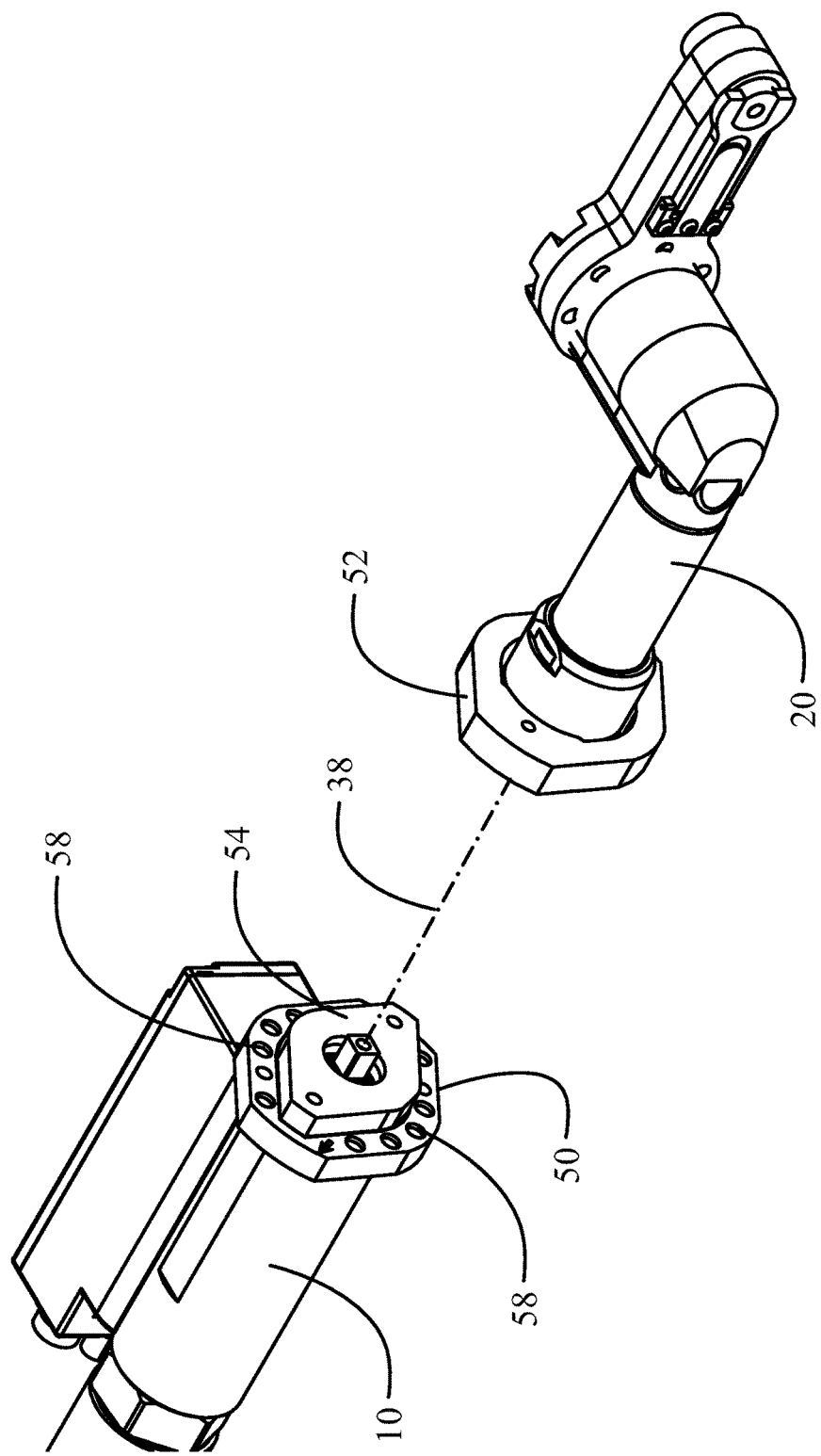
FIG. 3A is pictorial depiction of a third embodiment employing a drive motor assembly and end effector showing the details of the coupling components on the drive motor assembly.
Figure 3B:
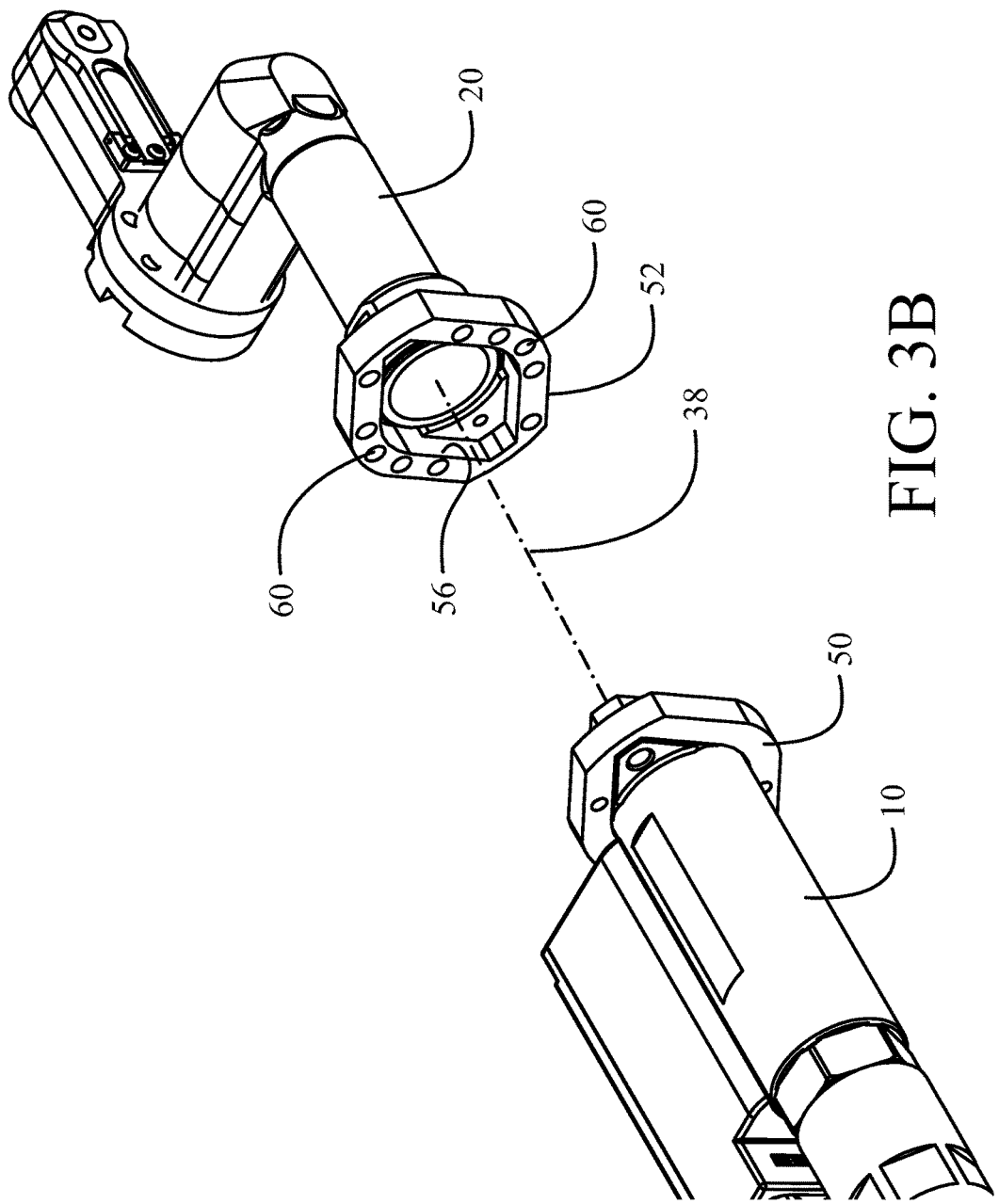
FIG. 3B is pictorial depiction of the third embodiment showing the details of the mating coupling components on the end effector.
Figure 3C:
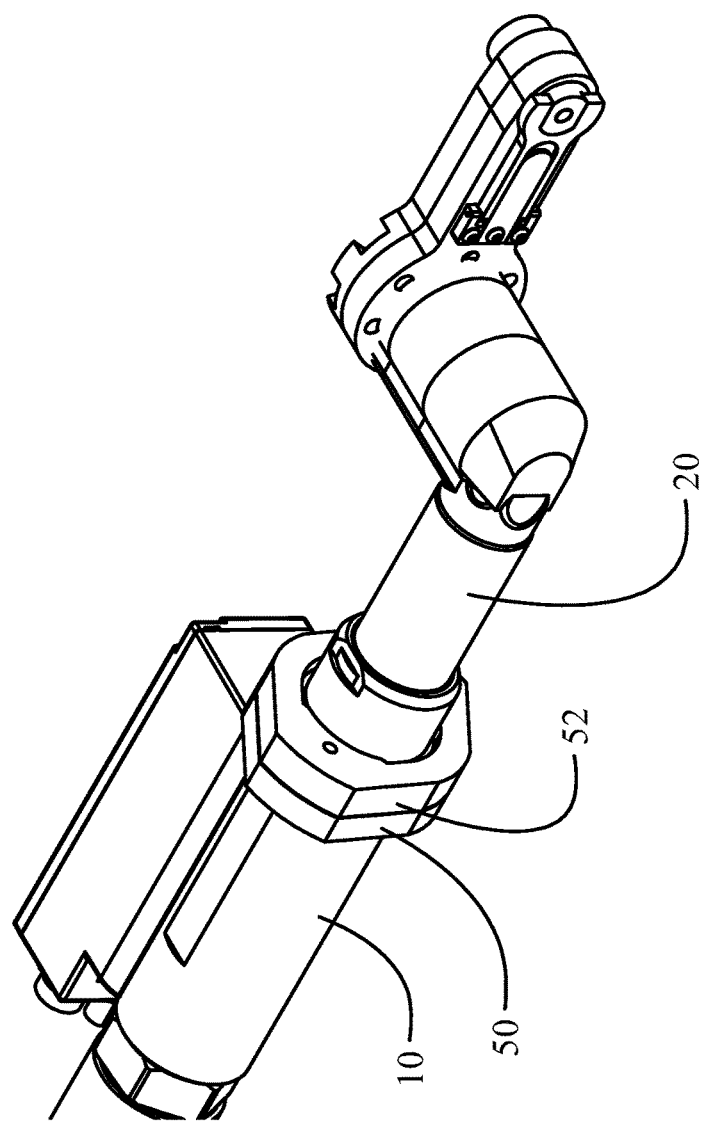
FIG. 3C is a pictorial depiction of the assembled drive motor assembly and end effector of the third embodiment.

Shaping of the interconnecting first and second flanges 14, 24 and antirotation mechanism such as hex shoulder 32 and relief 30 on the end effector 20 and drive motor assembly 10 may be altered to accommodate specific geometry or operational needs. FIGS. 3A-3C demonstrate an alternative embodiment in which flange 50 on the drive motor assembly 10 and mating flange 52 on the end effector 20 are modified elliptical shapes. Antirotation shoulder 54 extending from the flange 50 (seen in FIG. 3A) is a concentric modified elliptical shape which is received in relief 56 in mating flange 52 (seen in FIG. 3B). Shaping of the shoulder 54 and relief 56 prevent rotation when engaged. Flange 50 supports a plurality of magnets 58 which are placed in alignment for magnetic engagement with mating magnetic elements 60 supported by the mating flange 52 when the flange 50 and mating flange 52 are appropriately aligned for engagement of the antirotation shoulder 54 and relief 56. Engagement and disengagement of the drive motor assembly 10 and end effector 20 may be accomplished as previously described with respect to the first embodiment with use of a tool holder 34 for the end effector 20 using the robotic manipulator 37 to engage or withdraw the drive motor assembly 10 along connection axis 38 for engagement/disengagement of the magnets 58 and mating magnetic elements 60.

Figure 4A:
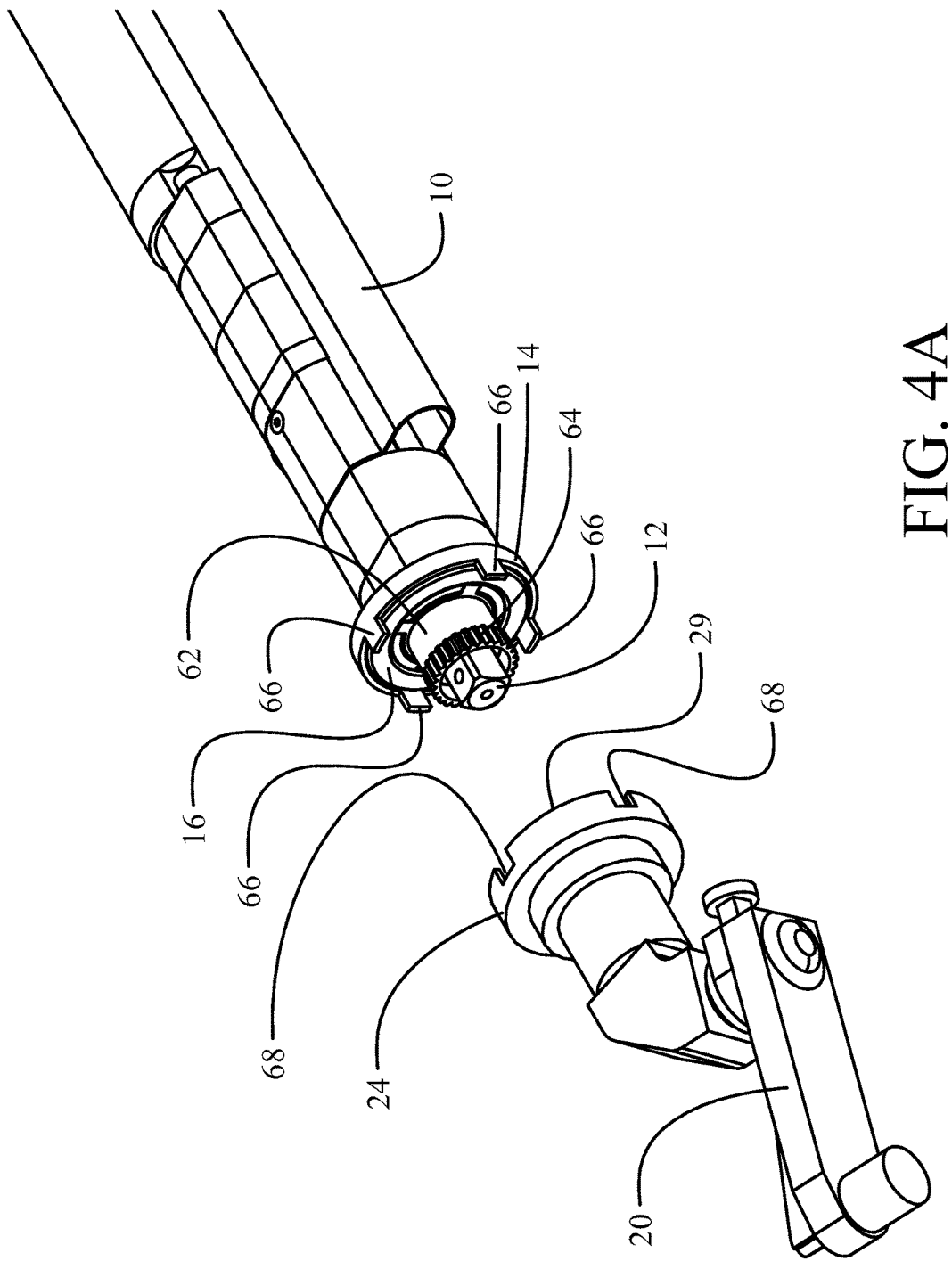
FIG. 4A is pictorial depiction of a fourth embodiment employing a drive motor assembly and end effector showing the details of the coupling components on the drive motor assembly.
Figure 4B:
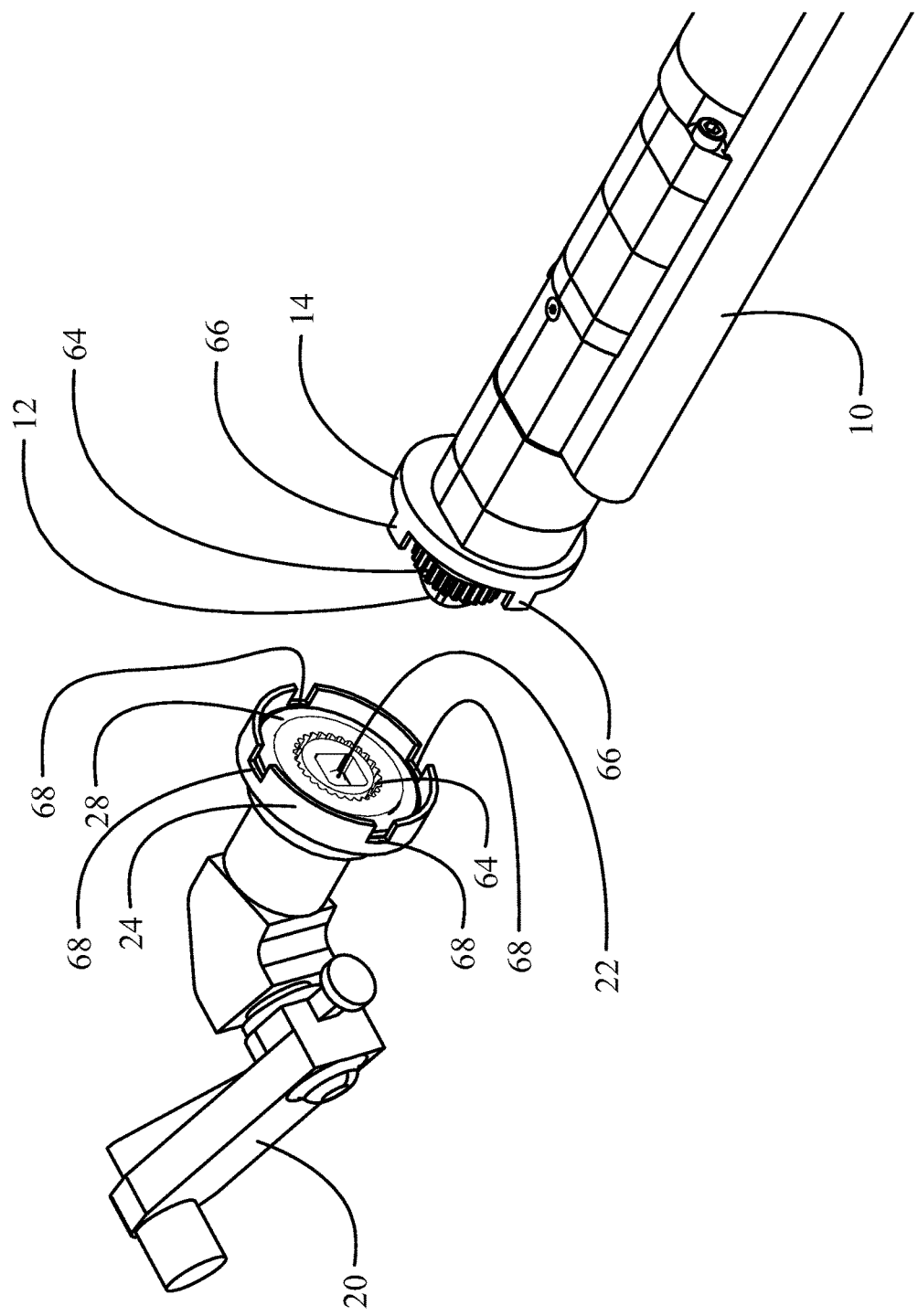
FIG. 4B is pictorial depiction of the fourth embodiment showing the details of the mating coupling components on the end effector.
Figure 4C:
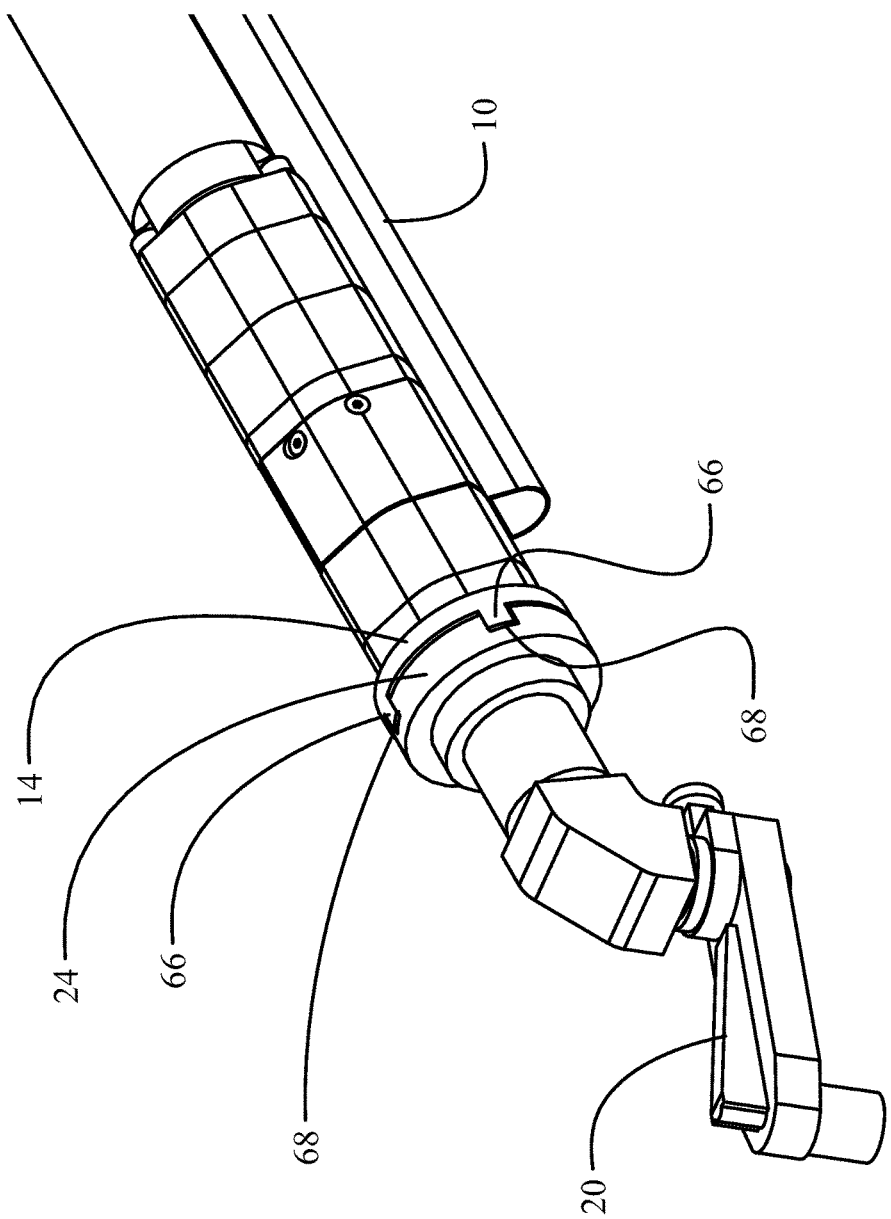
FIG. 4C is a pictorial depiction of the assembled drive motor assembly and end effector of the fourth embodiment.

Magnetic interengagement of the end effector 20 and drive motor assembly 10 may also be accomplished in a three point connection as shown for the embodiment in FIGS. 4A-4C. This configuration allows implementation of a torque transducer 62 in a floating drive train engaged by a gear 64 as seen in FIG. 4A. The torque transducer 62 is concentric with the center drive interface 12 extending through the center aperture 18 in flange 14 as in the first embodiment. Interengagement between the end effector 20 and the drive motor assembly 10 is accomplished at a first point between the center drive interface 12 and drive connection 22 accessed through mating aperture 28 in flange 24. The second point of engagement is between gear 64 extending from the torque transducer 62 and mating teeth 64 in the end effector 20. The third point of engagement is provided with a plurality of antirotation protrusions 66 extending from the periphery of flange 14 to be received in a plurality of mating slots 68 in the periphery 25 of mating flange 24. While multiple protrusions 66 and slots 68 are shown in the exemplary embodiment a single protrusion and mating slot or alternatively cylindrical pins to mating holes or slots may be employed. Contact of the flange 14 and mating flange 24 mutually engages the center drive interface 12 and drive connection 22 and engages the protrusions 66 in slots 68 as the antirotation mechanism. As in prior embodiments, the magnetic element 16 and mating magnetic element 26 separably engage flange 14 and mating flange 24 to secure the end effector 20 to the drive motor assembly 10 with magnetic engagement as seen in FIG. 4C.

Figure 5:
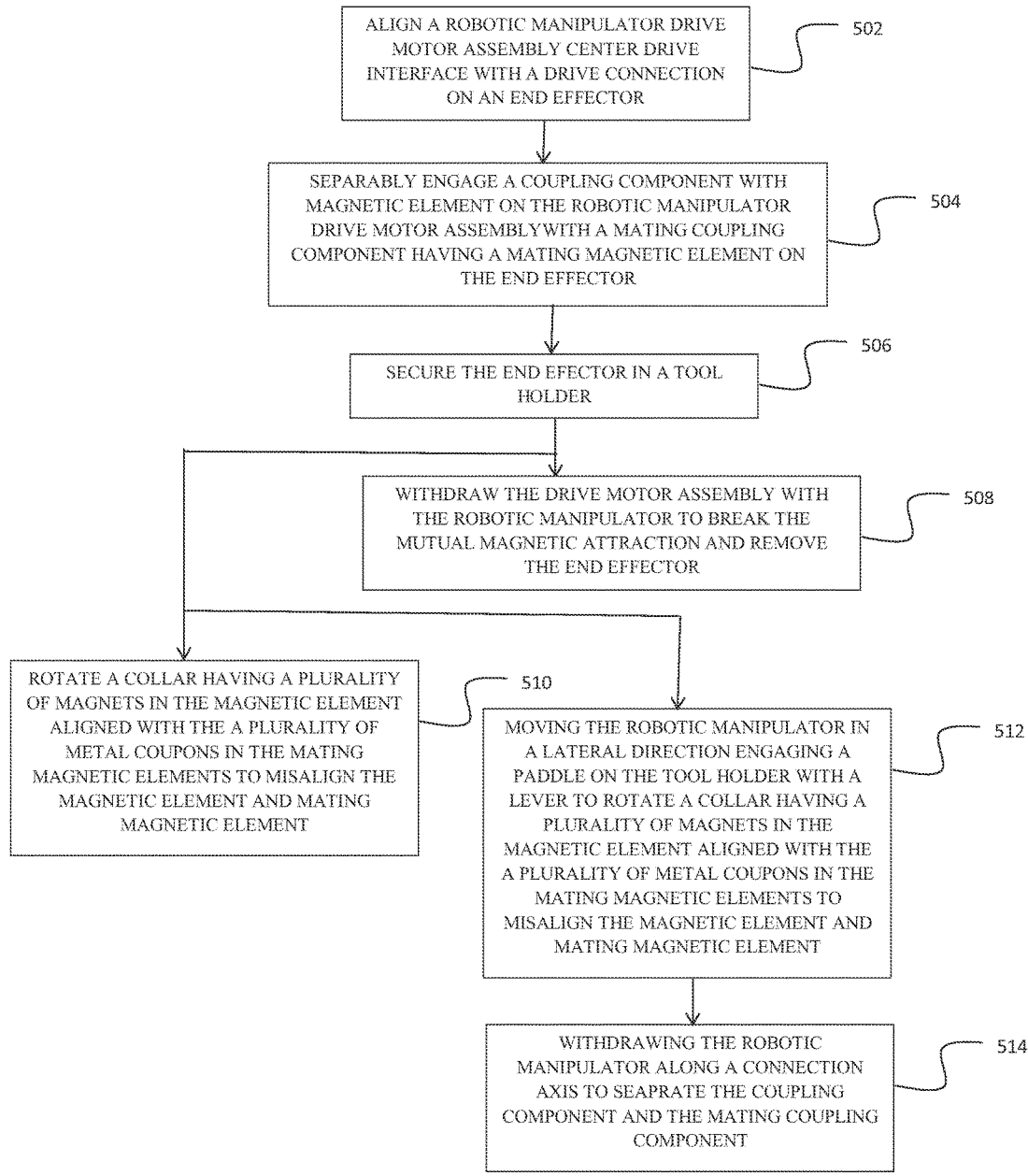
FIG. 5 is a flow chart showing a method of robotic tool end effector operation employing the embodiments disclosed herein.

A method for coupling a robotic end effector employing the embodiments disclosed is accomplished as shown in FIG. 5 with reference to exemplary embodiments of FIGS. 1A-1G and 2A-2F. A robotic manipulator having a drive motor assembly 10 including a center drive interface 12 is aligned with a drive connection on an end effector 20, step 502. A coupling component, such as flange 14, having a magnet element, such as magnet 16, and extending from the drive motor assembly 10 concentric with the center drive interface 12 is engaged with a mating coupling component, such as second flange 24, having a mating magnetic element 26 and extending from the end effector 20 concentric with the drive connection 22, step 504. The magnetic element and mating magnetic element are separably engaged by mutual magnetic attraction. The end effector tool may be secured in a tool holder 34, step 506, and the robotic manipulator 37 may withdraw the drive motor assembly 10 to separate the magnetic element and mating magnetic element to break the mutual magnetic attraction and remove the end effector 20 from the drive motor assembly 10, step 508. The coupling component may incorporate a collar 40 rotatably attached to the drive motor assembly 10 and the magnetic element may be a plurality of magnets 17 circumferentially spaced on a face 39 of the collar 40. The mating coupling component may then be a mating flange 24 having a mating face 25 and an aperture 18 concentric with the drive connection 12 and the mating magnetic element may be a plurality of ferromagnetic coupons 27 circumferentially spaced on the mating face in an aligning pattern with the plurality of magnets 17. The plurality of magnets may be oriented with common polarity to enhance the magnetic attraction. For separation of the end effector and drive motor assembly the collar 40 is then rotated to misalign the plurality of magnets 17 and ferromagnetic coupons 27, step 510. To accomplish the rotation the collar may include a rotation lever 44 and the tool holder 34 may incorporate an extending paddle 42 and the step of rotating the collar 40 is accomplished by moving the robotic manipulator 37 in a lateral direction to engage the paddle 42 with the rotation lever 44, step 512 and the step of withdrawing the robotic manipulator 37 is accomplished by moving the robotic manipulator along a connection axis 38 to separate the coupling component and the mating coupling component, step 514.

Figure 6:
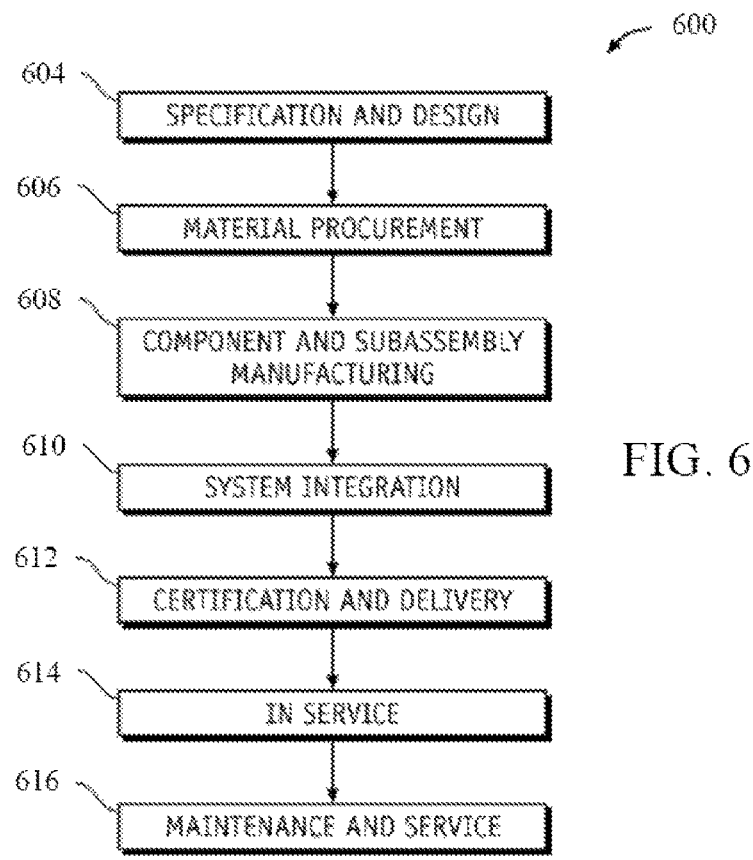
FIG. 6 is a flow chart depicting an aircraft manufacturing and service method in which the disclosed embodiments may be employed; and, FIG. 7 is a flow chart depicting an aircraft with which the disclosed embodiments may be employed.
Figure 7:
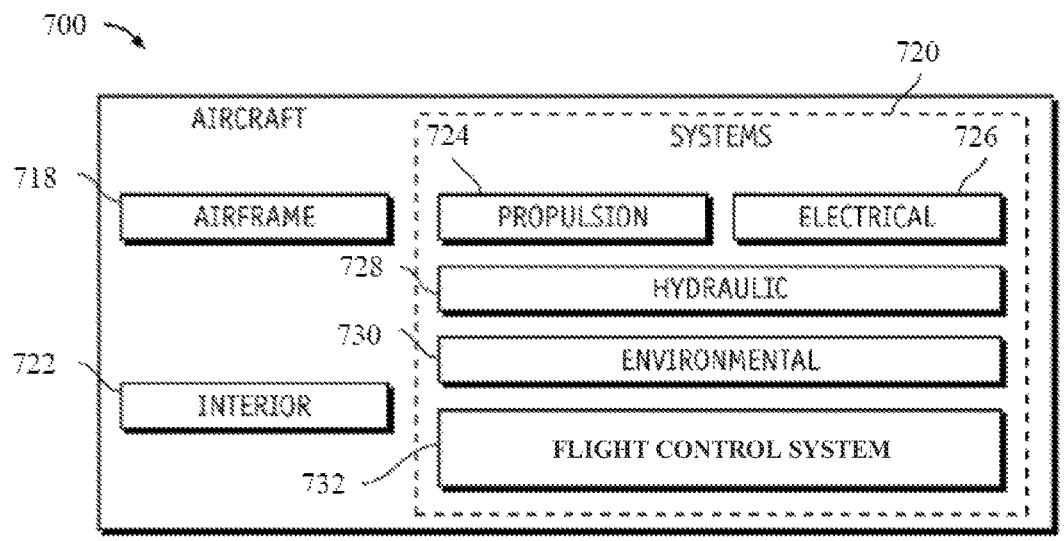

Embodiments of the disclosure may be employed in the context of an aircraft manufacturing and service method 600 (method 600) as shown in FIG. 6 and an aircraft 700 as shown in FIG. 7. During pre-production, the exemplary method 600 may include specification and design 604 of the aircraft 700 and material procurement 606. During production, component and subassembly manufacturing 608 and system integration 610 of the aircraft 700 takes place. Thereafter, the aircraft 700 may go through certification and delivery 612 in order to be placed in service 614. While in service by a customer, the aircraft 700 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 7, the aircraft 700 produced by the exemplary method 600 may include an airframe 718 with a plurality of systems 720 and an interior 722. Examples of high-level systems 720 include one or more of a propulsion system 724, an electrical system 726, a hydraulic system 728, an environmental system 730, and flight control system 732. Any number of other systems may also be included. Although an aerospace example is shown, the embodiments of the disclosure may be applied to other industries. The embodiments disclosed herein may be used on steps or elements 608, 610, 614, 616, 718 and 722. of the method and aircraft as disclosed in FIGS. 6 and 7

Apparatus and methods embodied herein and previously described may be employed during any one or more of the stages of the production and service method 600. For example, components or subassemblies corresponding to production process 608 may be fabricated or manufactured in a manner similar to components or subassemblies produced while the aircraft 700 is in service. In addition, one or more apparatus embodiments as described herein, method embodiments described herein, or a combination thereof may be utilized during the production stages 608 and 610, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 616.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A robotic end effector quick change coupling apparatus comprising:
    a robotic manipulator having controllable motion in at least one axis;
    a drive motor assembly connected to the robotic manipulator and having a center drive interface;
    a coupling component extending from the drive motor assembly and having a magnetic element;
    an end effector having a mating coupling component and having a drive connection adapted to removably receive the center drive interface, said mating coupling component concentric with the drive connection and having a mating magnetic element, said magnetic element and mating magnetic element separably engaged by mutual magnetic attraction;
    a tool holder incorporating a relief sized to closely receive the profile of the end effector, said tool holder adapted to removably receive and secure said end effector whereby motion of the robotic manipulator in the at least one axis joins or separates the coupling component and the mating coupling component and the robotic manipulator engages or disengages the end effector.

2. The robotic end effector quick change coupling apparatus as defined in claim 1 wherein the coupling component comprises a first flange having a center aperture concentric with the center drive interface and the mating coupling component comprises a second flange having an aperture concentric with the drive connection whereby contact of the first flange and second flange mutually engages the center drive interface and drive connection.

3. The robotic end effector quick change coupling apparatus as defined in claim 2 wherein the magnetic element comprises a plurality of magnets circumferentially spaced in a pattern on the first flange and the mating magnetic element comprises a plurality of ferromagnetic coupons circumferentially spaced on the second flange in a mating pattern with the plurality of magnets.

4. The robotic end effector quick change coupling apparatus as defined in claim 3 wherein the plurality of magnets are oriented with a common polarity.

5. The robotic end effector quick change coupling apparatus as defined in claim 2 wherein the magnetic element comprises a first plurality of magnets circumferentially spaced on the first flange and having a first polarity and the mating magnetic element comprises a second plurality of magnets circumferentially spaced on the second flange at a common spacing with the first plurality of magnets and having a polarity opposite to the first polarity.

6. The robotic end effector quick change coupling apparatus as defined in claim 1 wherein the magnetic element comprises a magnet and the mating magnetic element comprises a magnetically attractive metal.

7. The robotic end effector quick change coupling apparatus as defined in claim 1 wherein
    the coupling component comprises a collar rotatably attached to the drive motor assembly and the magnetic element comprises a plurality of magnets circumferentially spaced in a pattern on a face of the collar,
    the mating coupling component comprises a mating flange having a mating face and an aperture concentric with the drive connection whereby contact of the face and mating face mutually engages the center drive interface and drive connection, and the mating magnetic element comprises a plurality of magnetically attractive metal coupons circumferentially spaced on the mating face in a mating pattern with the plurality of magnets,
    said collar rotatable from a first orientation aligning the plurality of magnets and the plurality of magnetically attractive metal coupons for maximum magnetic attraction to a second orientation wherein the plurality of magnets and the plurality of magnetically attractive metal coupons are misaligned with minimal magnetic attraction.

8. The robotic end effector quick change coupling apparatus as defined in claim 1 wherein the coupling component comprises a first flange having a center aperture concentric with the center drive interface, said aperture having a shoulder and the mating coupling component comprises a second flange having a second aperture concentric with the drive connection, said second aperture having a relief, whereby contact of the first flange and second flange mutually engages the center drive interface and drive connection and engages the shoulder in the relief.

9. The robotic end effector quick change coupling apparatus as defined in claim 1 wherein the coupling component comprises a first flange having a center aperture concentric with the center drive interface, said flange having at least one slot and the mating coupling component comprises a second flange having a second aperture concentric with the drive connection, said second flange having at least one protrusion, whereby contact of the first flange and second flange mutually engages the center drive interface and drive connection and engages the at least one protrusion in the at least one slot.

10. The robotic end effector quick change coupling apparatus as defined in claim 9 wherein the at least one slot comprises a plurality of slots on a periphery of the first flange and the at least one protrusion comprises a plurality of protrusions on a periphery of the second flange.

11. A robotic end effector quick change coupling apparatus comprising:
    a robotic manipulator having controllable motion in at least a connection axis and a lateral axis;
    a coupling component connected to the robotic manipulator and having a collar rotatably attached to the drive motor assembly, said collar having a magnetic element comprising a plurality of magnets circumferentially spaced in a pattern on a face of the collar;

an end effector having a mating coupling component said mating coupling component having a mating flange with a mating face and an aperture concentric with the drive connection whereby contact of the face and mating face mutually engages the center drive interface and drive connection, said mating face having a mating magnetic element comprising a plurality of magnetically attractive metal coupons circumferentially spaced on the mating face in a mating pattern with the plurality of magnets, said magnetic element and mating magnetic element separably engaged by mutual magnetic attraction;

a drive motor assembly connected to the robotic manipulator and having a center drive interface, said coupling component extending from the drive motor assembly, said end effector having a drive connection adapted to removably receive the center drive interface said mating component concentric with the drive connection;

a rotation lever extending from the collar;

a tool holder adapted to removably receive and secure said end effector tool, said tool holder having an extending paddle engaging said rotation lever upon motion by the robotic manipulator in a lateral axis and whereby motion of the robotic manipulator in the connection axis separates the coupling component and the mating coupling component.

12. The robotic end effector quick change coupling apparatus as defined in claim 11 further comprising an antirotation mechanism having a first portion on the coupling component and a second portion on the mating coupling component.

13. The robotic end effector quick change coupling apparatus as defined in claim 11 wherein the coupling component comprises a first flange having a center aperture concentric with the center drive interface, said aperture having a shoulder and the mating coupling component comprises a second flange having a second aperture concentric with the drive connection, said second aperture having a relief, whereby contact of the first flange and second flange mutually engages the center drive interface and drive connection and engages the shoulder in the relief.

14. The robotic end effector quick change coupling apparatus as defined in claim 13 wherein the shoulder and relief comprise mating hex features.

15. The robotic end effector quick change coupling apparatus as defined in claim 1 wherein the coupling component comprises a first flange having a center aperture concentric with the center drive interface and the mating coupling component comprises a second flange having a second aperture concentric with the drive connection, and further comprising a shoulder surrounding the center aperture and a relief surrounding the second aperture, whereby contact of the first flange and second flange mutually engages the center drive interface and drive connection and engages the shoulder in the relief.

16. The robotic end effector quick change coupling apparatus as defined in claim 15 wherein the shoulder and relief comprise mating hex features.

17. A robotic end effector quick change coupling apparatus comprising:

a robotic manipulator having controllable motion in at least one axis;

a drive motor assembly connected to the robotic manipulator and having a center drive interface;

a coupling component extending from the drive motor assembly and comprising a first flange having a center aperture concentric with the center drive interface, said aperture having a shoulder and having a magnetic element;

an end effector having a mating coupling component said mating coupling component comprising a second flange having a second aperture concentric with the drive connection, said second aperture having a relief, wherein the shoulder and relief comprise mating hex features, whereby contact of the first flange and second flange mutually engages the center drive interface and drive connection and engages the shoulder in the relief, said second flange having a mating magnetic element, said magnetic element and mating magnetic element separably engaged by mutual magnetic attraction, said end effector having a drive connection adapted to removably receive the center drive interface.

18. The robotic end effector quick change coupling apparatus as defined in claim 17 wherein the magnetic element comprises a magnet and the mating magnetic element comprises a magnetically attractive metal.

19. The robotic end effector quick change coupling apparatus as defined in claim 17 wherein the magnetic element comprises a plurality of magnets circumferentially spaced in a pattern on the first flange and the mating magnetic element comprises a plurality of ferromagnetic coupons circumferentially spaced on the second flange in a mating pattern with the plurality of magnets.

20. The robotic end effector quick change coupling apparatus as defined in claim 19 wherein the plurality of magnets are oriented with a common polarity.

* * * * *